Feb. 10, 1970 J. E. SMART 3,494,483
PORTABLE PIPE HANDLING APPARATUS
Filed Oct. 4, 1968 2 Sheets-Sheet 1
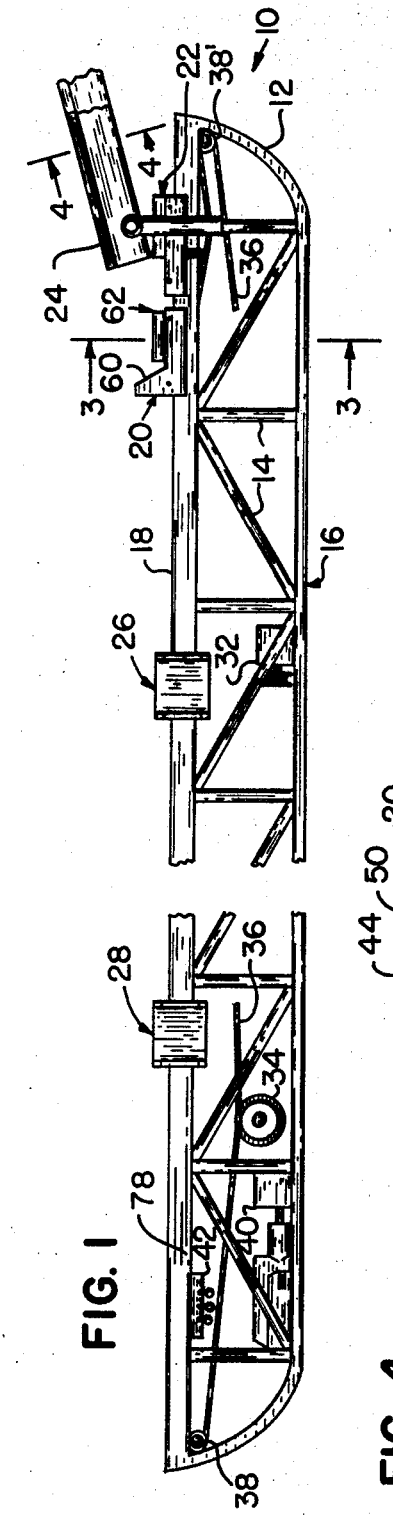
FIG. 1
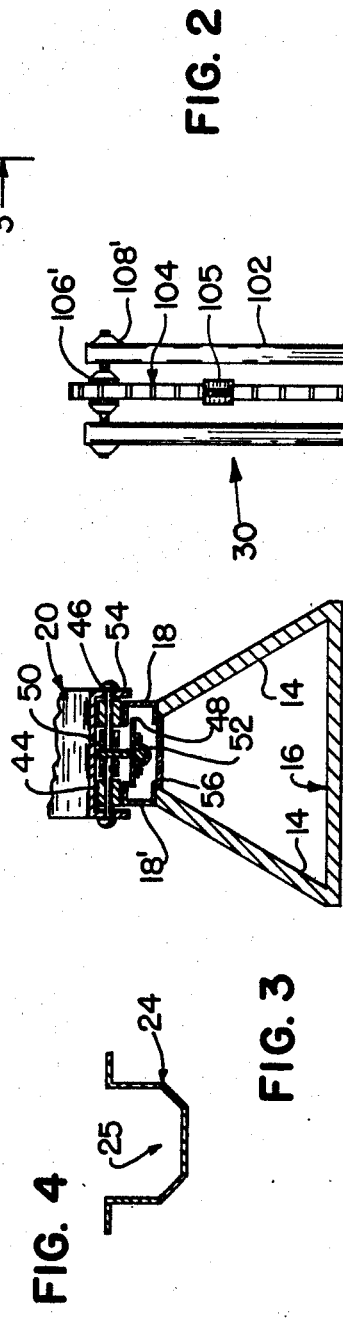
FIG. 2
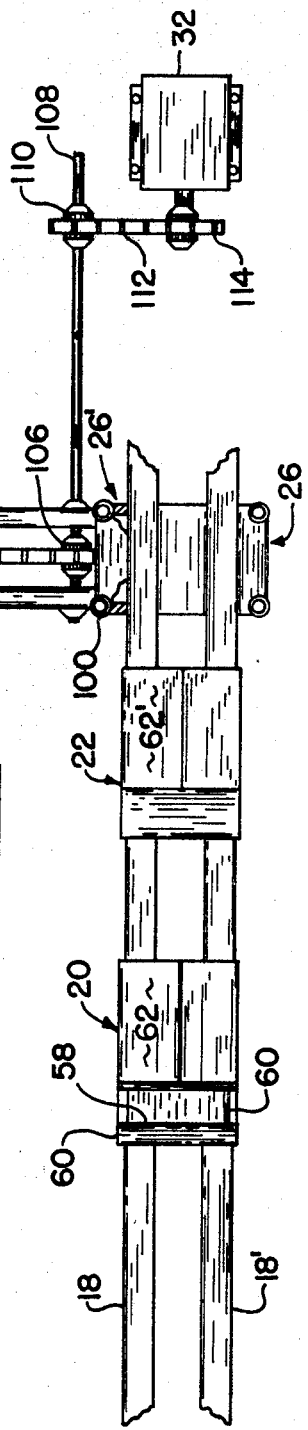
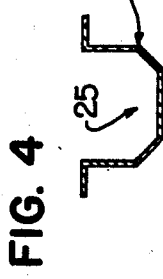
FIG. 3
FIG. 4

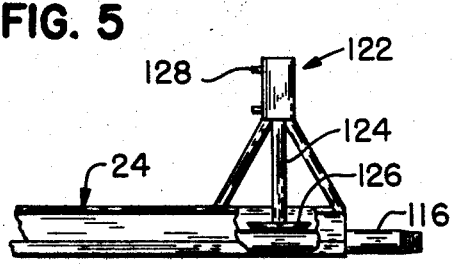
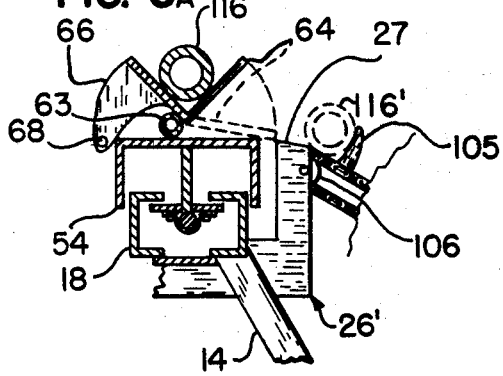
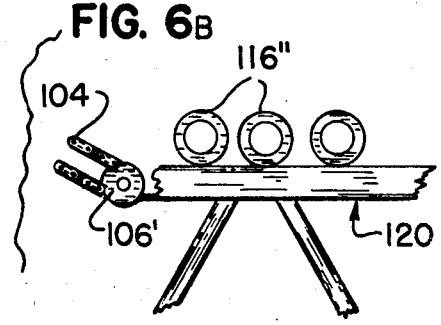
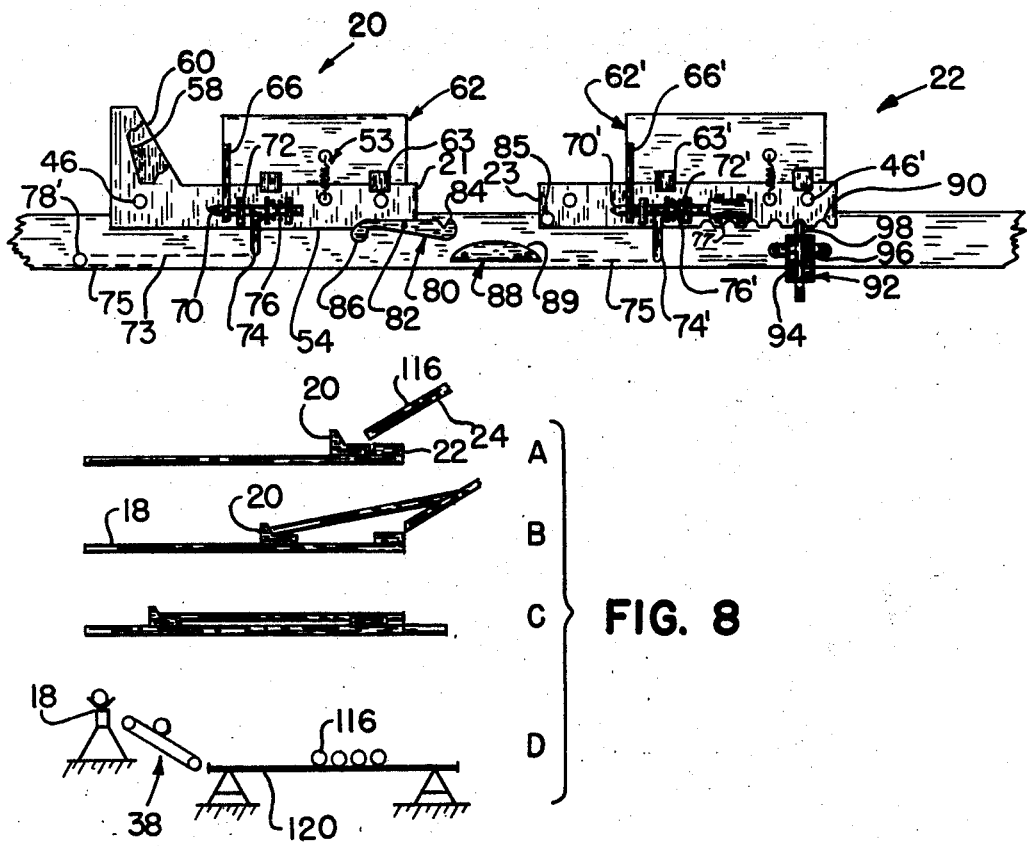

United States Patent Office 3,494,483
Patented Feb. 10, 1970

3,494,483
PORTABLE PIPE HANDLING APPARATUS
James E. Smart, 2405 Glenwood, Odessa, Tex. 79760
Filed Oct. 4, 1968, Ser. No. 765,209
Int. Cl. B25j 1/00, 5/00; E21b 19/00
U.S. Cl. 214—1                                                8 Claims

ABSTRACT OF THE DISCLOSURE

A pipe handling apparatus for racking pipe which includes a pair of cars slidably received upon an elongated track with the cars being positioned along the track in a pipe receiving relationship with respect to a pipe delivery chute. The cars include a latch means which enables movement of one of the cars to impart movement to the remaining car. The first car is positioned adjacent the chute to receive one end of a pipe, whereupon the pipe is transported by the car longitudinally along the track until the remaining marginal end portion of the pipe is received by the second car. A laterally arranged conveyor means transports the pipe away from the track and onto a pipe rack, whereupon the cars are again positioned in pipe receiving relationship with respect to the track and the chute in order to receive the next joint of pipe.

BACKGROUND OF THE INVENTION

The handling of pipe, tubing, casing, and the like, and especially heavy drill pipe, is usually time consuming, laborious, and dangerous. For example, in the drilling art, it is a common practice to "rack" the pipe within the well derrick by standing the pipe on one end where it is vertically disposed within the derrick, causing considerable side loads to be imposed upon the structure. Racking pipe in this manner is dangerous for the reason that a roughneck must be stationed high in the derrick on a "monkey board" in order to manipulate the pipe and to operate the elevator which lifts the pipe from the bore hole as the men on the derrick floor break up the pipe into individual joints. Therefore it is advantageous to be able to conveniently rack the pipe at a location remote from the drilling rig as the pipe is removed from the bore hole. This is especially so when the pipe is completing the last trip from the bore hole, and is to be transported to another drill site or to the drill yard.

Various apparatus have been proposed in the prior art for handling tubular goods, especially drill pipe handling apparatus. While these various apparatus handle the pipe in an improved manner, often effecting a great savings in both cost as well as increasing the safety of the workmen, the strenuous duty under which this apparatus must function often causes breakdown of the equipment which in turn presents costly maintenance problems. Furthermore, considerable manual labor is usually required with most pipe handling devices of the prior art in order to operate the apparatus as the pipe is removed from the rig.

SUMMARY OF THE INVENTION

The present invention is directed to a portable pipe handling apparatus for racking pipe, wherein a pipe chute transports the pipe from the derrick floor of a drilling rig to a pair of track mounted cars located on the main frame of the apparatus. A braking assembly controls the speed of the pipe through the pipe chute. The first car receives the lower free end of the pipe and moves the pipe end along the track until the remaining marginal end of the pipe falls into the second car. The cars continue to move along the track, carrying the pipe therewith, until the pipe is aligned with a laterally arranged pipe rack, whereupon the cars simultaneously dump the pipe onto a conveyor which transports the pipe from the track to the rack. The cars are then repositioned for receiving the next joint of pipe. The movement of the first car is utilized to position the second car by means of a releasable latch assembly and a decelerating means.

It is therefore an object of the present invention to provide an improved apparatus for handling tubular goods.

Another object of the present invention is to provide a portable apparatus for handling drill pipe in a manner which reduces the likelihood of the occurrence of damage thereto.

Another object of the present invention is to provide a pipe handling apparatus for racking pipe which includes a pair of cars which receives the pipe in an improved and reliable manner.

Still another object of this invention is the provision of a portable pipe handling apparatus having a powered first car which imparts the necessary motion into the second car in order to position the cars along a track in a predetermined manner.

A further object of this invention is to provide a portable pipe handling apparatus which includes a pipe brake associated with a pipe chute in order to minimize damage to the pipe and to the apparatus.

A still further object of the present invention is the provision of a pipe handling apparatus which transports the pipe longitudinally away from a pipe receiving station to other predetermined stations, after which the pipe is laterally transported away from the pipe handling apparatus.

The above objects are attained in accordance with the present invention by the provision of a pipe handling apparatus fabricated essentially as outlined in the above abstract.

BRIEF DESCRIPTION OF THE DRAWINGS

FIGURE 1 is a side elevational view of a skid mounted pipe handling apparatus made in accordance with the present invention, with some parts being cut away and shown in other figures contained herein;

FIGURE 2 is a fragmentary top plan view of the apparatus seen in FIGURE 1;

FIGURE 3 is a partially cross-sectional view taken along line 3—3 of FIGURE 1;

FIGURE 4 is a cross-sectional view taken along line 4—4 of FIGURE 1;

FIGURE 5 is a fragmentary side elevational view of a portion of the apparatus not shown in FIG. 1;

FIGURES 6A and 6B are partially cross-sectional views of the apparatus seen in FIGURES 1 through 4, with some parts being broken away and not shown;

FIGURE 7 is an enlarged fragmentary side elevational view of part of the apparatus seen in FIGURE 1; and FIGURE 8 is a schematical representation which diagrammatically sets forth the various steps of operation which the apparatus seen in the foregoing figures may undergo when racking pipe.

DETAILED DESCRIPTION OF THE PREFERRED EMBODIMENT

Looking now to the details of the drawings, and in particular to FIGURE 1 in conjunction with the remaining figures, the arrow at numeral 10 generally indicates a portable pipe handling apparatus for racking pipe. The apparatus includes a built-up framework of tubular steel which provides a main structural body contoured at either end as seen at 12 in order to facilitate skidding the apparatus from a trailer bed into any desired location. Various interconnecting structural members 14 rigidly tie a bottom supporting portion 16 to a top portion 18 with the top portion being comprised of two spaced apart longitudinally disposed tracks. Slidably received and captured by he tracks are a first and second car 20 and 22, respectively. Supported by the main body in overhanging relationship to the cars there is seen an inclined pipe chute 4 with the lower terminal end thereof operatively disposed with respect to the cars and specifically placed to enable a pipe to be received by the first car. Spaced apart conveyor attachment means 26 and 28 are provided adjacent to and spaced apart from each rail 18, 18' in a manner to receive the conveyor means 30 which is attached thereto. While only one conveyor means 30 is illustrated in the drawing, it should be understood that two conveyor means are employed in pairs with the conveyor means being attached to either side of the apparatus, as desired, depending upon the location of the pipe rack with respect to the main body.

A hydraulically actuated motor and brake assembly 32 is enclosed within the main framework. A hydraulic motor powered cable drum 34 receives several turns of an endless cable 36 about the outer peripheral surface of the drum and selectively imparts movement to the cable. The cable extends from the drum and is received about each of the pulleys 38, 38' and continues within the tunnel defined by the spaced apart tracks in order to impart movement to the first car 20. An internal combustion engine is seen to be suitably geared to a hydraulic pump 40. Control panel 42 enables a single technician to control the operation of the motor, pump, drum, and conveyor motor.

Each car is slidably disposed in captured relationship with respect to the track by means of several spaced apart rollers, one of which is seen at 44, with the rollers being journaled to and supporting the car from the upper horizontal surface of the track. Each car includes a plate member 48 which is interconnected to the car by means of vertical member 50. The inner adjacent edge portions of the tracks overlap the outer marginal edge portions of the plate member in order to capture the car to the track without impeding the longitudinal movement of the car. The cable is secured to the plate member by means of a cable clamp 52. The car includes downwardly depending edge portions 54 which forms a skirt and encloses the upper outer marginal edge portion of the track. Spaced apart plate members 56 tie the individual track members together as best seen in FIGURE 3.

The first car includes an inclined surface 58 normally arranged with respect to the chute which is enclosed by spaced apart vertically disposed bulkheads 60. Operatively mounted on each car is a pipe receiving and dumping V-shaped cradle member 62 which is pivotally mounted to the car as seen at hinge 63. The cradle has the apex thereof located with respect to the journal or hinge whereby the center of mass of the pipe carrying cradle is off-set with respect to its journaled pivot point 3 to thereby enable the cradle to rotate from the solid line position illustrated in FIGURE 6A to the dot-dash position seen at 64. Contoured web 66 has an aperture 68 diametrically placed therethrough for the purpose of receiving pin 70. Pin 70 is part of the cradle locking means and is slidably received within lugs 72 with the pin being actuated in a reciprocating manner by handle 74. Biasing means 76 maintains the pin urged into the locked position with respect to aperture 68. Abutment 78' cooperates with the handle 74' of car 22 to unlatch the V-shaped cradle member when the handle strikes the abutment. A second abutment 78 cooperates with handle 74 to unlatch the V-shaped cradle member associated with the car 20. It will be noted that handle 74' has the lower extremity thereof disposed at dot-dash line 75 and will accordingly abut the pin 79' while the handle 74 is disposed along dot-dash line 73 and accordingly clears the pin 78'.

A hydraulically actuated cylinder 77 is mounted on car 22 with the piston operated shaft thereof interconnected to the pin 70'. Hose connections (not shown) extend free of the tracks and are connected through the panel to a source of hydraulic fluid pressure.

Latch 80 cooperates with latch pin 85 to provide a latch means associated with the first and second car for releasably attaching the cars together when the first car is brought into close proximity or abutting relationship with respect to the second car. The latch means includes a contoured portion 84 having a detent therein which engages the latch pin when the cars are brought into close proximity to each other. Enlarged end portion 86 of the latch cooperates with the contoured surface 89 of cam means 88 to cause the latch 80 to pivot about pin 82 as portion 86 rides over surface 89.

A multiplicity of half moon cut-outs 90 are longitudinally disposed along the lower marginal edge portion of the skirt of the second car. The cut-outs receive a biased plunger 92 therein to provide a braking or decelerating action for the second car. As best seen in FIGURE 7, a housed spring 94 bears against the housing and washer 96 to thereby bias the pin 98 vertically upwards into the illustrated position where the pin is removably received in a ratchet like manner within one of the cut-outs.

Looking now to the details of FIGURES 2, 6A, and 6B, which discloses the pipe conveyor means, two spaced apart cantilever arms 102 are attached together and maintain a chain 104 laterally disposed with respect to the track. The chain includes pipe engaging arms 105 secured at spaced apart intervals thereto. The chain is rotatably disposed between sprockets 106, 106'. The sprockets are journaled at the depending ends of the cantilever arms with the sprocket drive shaft 108 continuing to the second conveyor system (not shown) which is identical to the conveyor illustrated by the arrow at numeral 30. Shaft 108 maintains the pipe receiving arms 105 of each spaced apart conveyor synchronized with respect to one another. The shaft is rotatably driven by chain 112 which is driven by sprocket 114, which in turn is powered by the before described hydraulic motor 32. As best seen in FIGURES 6A and 6B, the conveyor transports pipe in a lateral direction away from the track and to a pipe rack 120.

FIGURE 8 schematically sets forth the operation of the apparatus wherein FIGURE 8A shows pipe 116 as is delivered by means of chute 24 to the first car 20. FIGURE 8B shows the first car 20 supporting one end of the pipe while the remaining depending end of the pipe slides down the chute. FIGURE 8C shows both cars operatively supporting the pipe. FIGURE 8D shows the pipe as it is being conveyed to the pipe rack 120.

FIGURE 5 sets forth the details of a remote controlled pipe braking system. The brake includes a hydraulic actuated cylinder 122 within which a piston reciprocates in order to controllably impart movement to piston shaft 124. A brake shoe 126 cooperates with the outer peripheral surface of a pipe 126 in order to control the speed of the pipe as it slides down through the pipe chute. Hydraulic fluid flow connectors 128 are flow attached to the source of hydraulic fluid pressure through the control panel, the details of which are not shown since such an expedient may take on several different forms and also lies within the knowledge of those skilled in the art.

OPERATION

As best seen in FIGURE 8, the purpose of the invention is to receive pipe from a pipe conveying chute 24 and to rack the pipe where it can be conveniently stored. The pipe conveying chute is generally located with the pipe receiving end thereof located near the derrick floor to enable roughnecks to place the lower free end of individual joints of pipe onto the chute as the string of pipe is broken down during its removal from a bore hole. This operation enables a fast line or the elevator to withdraw successive joints of pipe from the bore hole whereupon the roughnecks disjoint the sections by using slips in the usual manner. The pipe is then lifted and the disjointed end is placed within the upper end of the chute so it can be conveniently lowered through the upper free end of the chute. As the pipe is slidably received by the chute, the brake 122 enables the operator located at the control panel 42 to control the rate of speed of the pipe as it slides through the chute by controlling the application of pressure which the shaft 124 places upon the brake shoe. This braking action causes the pipe to be controllably received by inclined portion 58 of the first car, thus avoiding damage to the pipe threads. As the pipe abuts surface 58, the potential energy of the pipe forces the car to continue to move toward the operator with the apparatus assuming the position seen in FIGURE 8B. The pipe continues to slide down the chute and falls into the second car (best seen in FIGURE 8C). Both cars are next positioned adjacent the conveyor by actuating the cable drum in order to align the pipe with the two spaced apart conveyors which have previously been aligned with the pipe rack. As the two cars move into an unloading position, handle 74 of the first car strikes abutment 78 located near the operator whereupon pin 70 is withdrawn or forced into the unlocked position. The hydraulic cylinder 77 is simultaneously actuated by the operator thereby causing the cradles supporting the joint of pipe to pivot into the dot-dash position indicated by numeral 64. This action dumps the pipe, and the pipe is now free to roll down the slightly inclined surface formed by one side 64 of the cradle where the pipe is received by sloped edge portion 27 of attachment means 26, as it rolls against one of the arms 105 of the conveyor. The conveyor transports the pipe outwardly and downwardly onto the pipe rack 120 where each successive joint of pipe forces the multiplicity of previously racked pipes to assume an orderly stored arrangement.

Looking more specifically now to the details of operation of the cars, it will be apparent from the foregoing description that the first car is movable from one to the other end of the track by the action of the cable drum 34. The movement of the first car is utilized to position the second car. For example, assuming the first and second cars to be positioned as seen in FIGURES 8C and 8D, and with the pipe having dumped onto the conveyor, the first car is moved along the track towards the chute. As the end plate 21 of the first car abuts end plate 23 of the second car, latch 80 engages pin 85, and the first car forces the second car to travel towards and under the outlet end of the chute. The first car is now positioned with plate member 58 being normal with respect to the pipe within the chute and accordingly the first car is ready to receive the lower end of a pipe. As the pipe abuts the plate member and continues to slide down the chute, the first car travels towards the operator, carrying the second car therewith since the latch means is in the engaged or latched position. The pipe is jointly supported by the first car and the chute during this portion of the operational cycle.

As the cars travel towards the operator, the latch enlargement 86 rides over the cam 88, the latch detent is pivoted away from the latch pin 85 causing it to release. This action releases the second car from the first car, and the first car continues travel towards the operator. At this part of the cycle, the cable drum is used to augment the power provided by the potential energy of the pipe.

Upon release of the latch means, the arresting means in the form of ratchet 90, 98 associated with the skirt of the second car decelerates and stops the second car in a position where it is spaced apart from the chute so as to enable the marginal end portion of the remaining free end of the pipe to fall onto the cradle of the second car. The pipe now assumes the illustrated position seen in FIGURE 8C, with the cradles of the cars jointly supporting the entire weight of the pipe. It will be noted that the exact position required of the second car is less critical as compared to the first car, and accordingly the location of cam 88 with respect to the latch 80 is easily ascertained through trial and error. The actual position of the two cars, the cam, and the ratchet pin 96 as generally illustrated in FIGURE 7 have proven satisfactory for moderate speeds of the first car. The cam 88 can be removed to another location if the car fails to stop with the pin engaging the cut-outs.

As both cars travel towards the operator, lever 74 clears abutment 78', cam 88, as well as the conveyor attachment hinges 26, 28. As lever 74 of the first car strikes abutment 78, the pin 70' is simultaneously actuated by the operator by application of fluid pressure thereto to thereby cause both pins 70, 70' to be withdrawn from the lugs 72, 72'. The weight of the pipe causes the cradles to simultaneously pivot about their journals and fall into the configuration indicated by the dot-dash lines at 64 in FIGURE 6A. This over the center action allows the pipe to roll off the cradle and onto each of the sloped edges 27 where arms 105 of each conveyor laterally conveys the pipe onto rack 120. It will be noted that each conveyor is positions in overlapping relationship with respect to the main pipe rack members so as to enable the pipe to be gently set down upon the main support members of the pipe rack.

Should the operator fail to actuate the hydraulic dumping cylinder of car 22, pin 78' will engage handle 74' to thereby cause the second car to dump in timed sequence with the respect to the first car. Failure of the second car to dump simultaneously with the first car will not usually result in loss of control over the pipe joint so long as the brake associated with motor 32 prevents one end of the pipe being advanced down the conveyor while the remaining end is held in the cradle of the second car.

After the cradles have dumped the pipe, springs 53, together with the weight of web 66, cause the cradles to return to the pipe receiving configuration. Movement of the first car releases handle 74, while release of a valve means controls the action of pin 70'. This action causes the pins to be urged back into the locked position by springs 76, 76'. The first car is now moved back under the chute, locking onto and carrying the second car with it, so as to begin the next cycle of operation.

Where it is desired to locate the pipe rack on the opposite side of the track, the conveyors 30 are removed from the conveyor anchor 26' and attached to conveyor 26. Vertically aligned removable pins 100 enable this operation to be carried out with a minimum of effort. The relocation of the conveyors also requires that the cradles must dump to the opposite side, and accordingly the cradles are merely reversed within their journals, leaving the cradle in the opposite configuration seen in FIGURE 7. This requires that duplication of the pin, handle, and abutments be arranged on opposite sides of each car.

It is contemplated to also use the instant apparatus to convey joints of pipe from a pipe rack back up the chute and onto the derrick floor where the pipe joints can be assembled into a tool string. This expedient is best accomplished by positioning the chute where it lays close to the track aft of the second car, and by repositioning the latch means, conveyor, and decelerating means. The conveyor travel is reversed in rotational direction, causing the racked pipe to be moved upwards toward the track by arm 105 where the pipe is forced onto the cradle side 64. The slope of edge portion 27 together with the over-the-center action of the cradle is preferably reversed to that illustrated in FIGURE 6 in order to cause the pipe to roll onto the cradle after it is released by the conveyor, and for the cradle to close when the pipe is received within the cradle apex. The cars carrying the pipe are now moved towards the lower extremity of the chute. As the terminal end of the pipe carried by the second car strikes the lower marginal end portion of the chute, the sloped member 58 of the first car bears against the opposite end of the pipe, forcing the pipe up into the chute as the pipe lifts from the second cradle. Continued movement of the first car forces the pipe further up the chute where the brake assembly 122 holds the pipe until the elevator attached thereto. The cars, now latched together, are brought back into the position of FIGURE 8C (minus the pipe), with the relocated latch means and decelerating means causing the second car to stop with the cradles being aligned with respect to the conveyors.

What I claim is:

1. A pipe handling apparatus for racking pipe comprising:
   an elongated main frame having a track longitudinally supported thereon;
   a first car being movably disposed on said track and adapted to support one end of a pipe;
   a second car being movably disposed on said track and adapted to support the remaining end of the pipe;
   said first and second cars adapted to be moved into close proximity to one another, and away from one another;
   a pipe delivery chute overhanging said track and adapted to deliver a pipe to said first and second cars to thereby enable the cars to support and move a pipe along said track;
   means for selectively imparting longitudinal movement to said first car;
   latch means for attaching said first and second cars together when said cars are moved into close proximity to each other;
   releasing means for releasing said first and second cars from one another for positioning said second car in a pipe receiving position along said track; and
   means for conveying a pipe laterally away from said track.

2. The pipe handling apparatus of claim 1, and further including a decelerating means for arresting said second car where it will be positioned in the recited pipe receiving position along said track.

3. The apparatus of claim 2 wherein said decelerating means is actuated independent of said releasing means being actuated to thereby enable said second car to be released from said first car and brought to a stop at the recited pipe receiving position along said track;
   said decelerating means including a biased pin, a series of spaced apart pin receiving cut-outs in said car, said pin being reciprocatingly mounted adjacent to said track and adapted to engage said cutouts to thereby increase the friction between the car and track.

4. The apparatus of claim 1 wherein said means for conveying the pipe includes two spaced apart conveyors having pipe receiving arms for receiving and conveying the pipe;
   said conveyors being laterally disposed with respect to said track to thereby provide the recited function of conveying the pipe laterally away from said track.

5. The apparatus of claim 1 wherein said first car includes a sloped wall for receiving the terminal end of a pipe; a cradle including journal means between said cradle and car to enable said cradle to pivot from a pipe receiving to a pipe dumping position;
   said journal being off-set with respect to the lower extremity of the cradle to thereby impart an over-the-center motion to the cradle when the pipe rests therein;
   biasing means for maintaining the cradle upright when the cradle is empty; and locking means for selectively maintaining the cradle upright when the pipe rests therein.

6. The apparatus of claim 5 wherein said locking means includes a depending handle for moving said locking means from a locked to an unlocked position;
   spaced apart abutment means cooperating with each said handle to unlock said locking means when it is desired to pivot said cradle into the pipe dumping position.

7. The apparatus of claim 1 and further including a brake means for controlling the velocity of the pipe as it passes through the delivery chute;
   said brake means including a shoe adapted to press against the pipe; and
   means for selectively controlling the pressure which said shoe exerts upon the pipe.

8. The apparatus of claim 1, and further including a decelerating means for positioning said second car in the recited pipe receiving position along said track;
   said means for conveying the pipe includes two spaced apart conveyors having pipe receiving arms for receiving and conveying the pipe;
   said conveyors being laterally disposed with respect to said track to thereby provide the recited function of conveying the pipe laterally away from said track.

References Cited
UNITED STATES PATENTS

| | | | |
|---|---|---|---|
| Re. 24,907 | 12/1960 | Maydew | 214—2.5 |
| 3,169,645 | 2/1965 | Freeman. | |

ALBERT J. MAKAY, Primary Examiner

FRANK E. WERNER, Assistant Examiner

U.S. Cl. X.R.

214—2.5